United States Patent [19]

Gatewood

[11] 4,086,996

[45] May 2, 1978

[54] SELF-ADJUSTING CLUTCH RELEASE BEARING CARRIER ASSEMBLY

[75] Inventor: Sidney Ulane Gatewood, Roseville, Mich.

[73] Assignee: Borg-Warner Corporation, Chicago, Ill.

[21] Appl. No.: 754,912

[22] Filed: Dec. 28, 1976

[51] Int. Cl.² ............................................. F16D 13/75
[52] U.S. Cl. ............................................. 192/111 A
[58] Field of Search ........................ 192/111 A, 70.25

[56] References Cited

U.S. PATENT DOCUMENTS

| | | | |
|---|---|---|---|
| 2,002,841 | 5/1935 | Tatter | 192/111 A |
| 2,040,034 | 5/1936 | Tatter | 192/70.22 |
| 2,061,093 | 11/1936 | Tatter | 192/111 A X |
| 2,421,869 | 6/1947 | Brock | 192/111 A |
| 3,286,803 | 11/1966 | Zeidler | 192/111 A |
| 3,361,239 | 1/1968 | Binder | 192/89 B |
| 3,433,341 | 3/1969 | Bohn et al. | 192/111 A |
| 3,868,006 | 2/1975 | Linn et al. | 192/111 A |
| 3,938,636 | 2/1976 | Nerska | 192/111 |
| 3,946,845 | 3/1976 | Kamio | 192/111 A |

Primary Examiner—Benjamin W. Wyche
Attorney, Agent, or Firm—James A. Geppert

[57] ABSTRACT

An automatic clutch wear adjuster incorporated in a clutch release bearing assembly to automatically compensate for lining wear in the clutch while maintaining clearance between the release bearing and clutch release levers when the clutch is in its engaged position. The self-contained, self-adjusting release bearing carrier assembly includes a bearing carrier encompassing a transmission bearing retainer, a reactor, a release bearing telescoped on the carrier, and a one-way clutch between the bearing carrier and the bearing and cooperating with the reactor to provide a relative axial positioning of the bearing on the carrier for adjustment of the length of the bearing carrier assembly.

17 Claims, 6 Drawing Figures

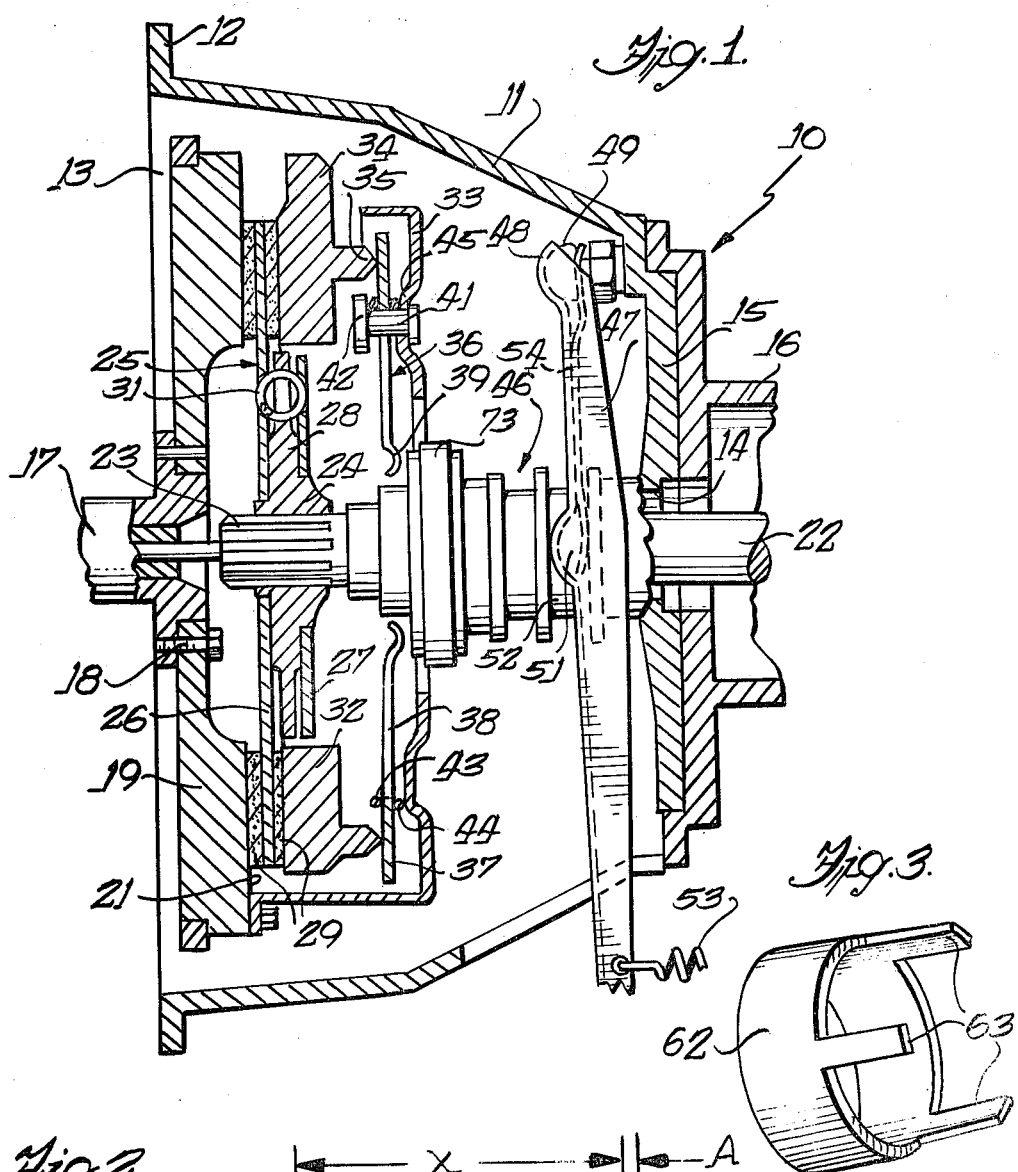
Fig. 1.
Fig. 3.
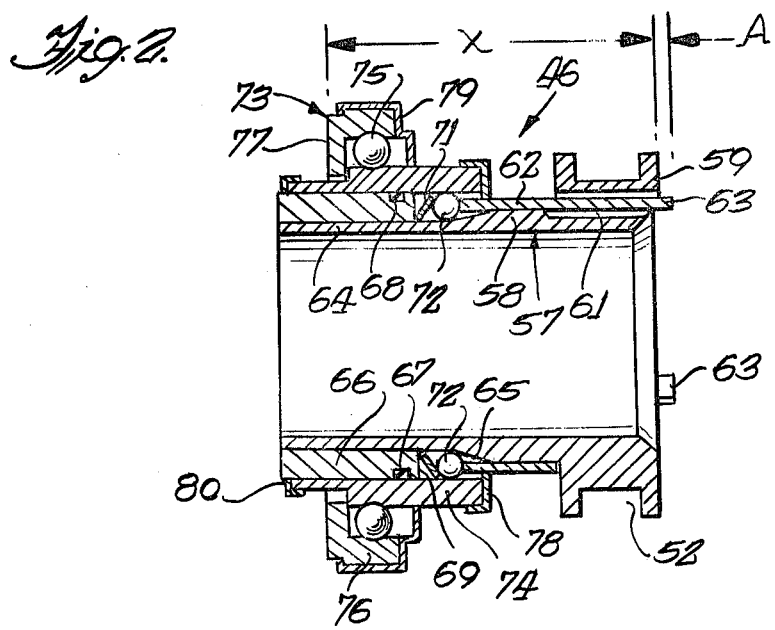
Fig. 2.

SELF-ADJUSTING CLUTCH RELEASE BEARING CARRIER ASSEMBLY

BACKGROUND OF THE INVENTION

The present invention relates to vehicle torque transmitting clutches of the direct pressure type wherein a release bearing is axially shifted on the driven shaft to operate the clutch release levers or spring fingers of a Belleville spring and disengage the driven clutch plate from the flywheel and pressure plate of the driving shaft assembly. Over a long period of use, the friction facings or linings will exhibit wear and the clutch spring or springs are required to move the pressure plate closer to the flywheel to fully engage the clutch.

It is desirable that a clearance or free play exist between the release bearing and the ends of the clutch release levers or spring fingers as evidenced by free play at the clutch pedal pad so that there is no constant contact to cause clutch slippage, wear, vibration or noise. However, the wear of the clutch disc facings forces the levers or spring fingers toward and into direct engagement with the release bearing and binds the bearing carrier against the release fork, thus preventing the pressure plate from exerting its full force on the friction facings. To alleviate this problem, the operator of the vehicle must have the clutch serviced before clutch slippage due to facing wear becomes pronounced. Such manual adjustment consists of altering the angle of the clutch release fork to reposition the release carrier and bearing until the initial bearing to finger clearance and free play in the pedal are re-established. It is well known that a large percentage of clutch failures in passenger cars is due to owner neglect of maintaining free play in the clutch pedal.

To overcome this problem, various methods of automatic adjustment of the clutch release carrier were attempted; however, in many instances, the release bearing was maintained in direct engagement with the clutch release levers or spring fingers resulting in undesirable wear and/or noise caused by the constant engagement. The present invention overcomes these disadvantages of previous automatic adjusting devices in providing a self-contained, self-adjusting release bearing carrier assembly providing a predetermined clearance between the release bearing and the release levers or spring fingers.

SUMMARY OF THE INVENTION

The present invention relates to an improved automatic wear adjuster incorporated in the release bearing carrier assembly for the clutch of an automotive vehicle that provides the required free play at the clutch pedal and automatically compensates for clutch facing wear while maintaining a consistent clearance between the release bearing and the clutch release spring fingers or levers. The release bearing carrier includes a tubular bearing carrier and the inner race of the release bearing telescoped thereover and arranged to allow relative axial movement therebetween. A yieldably biased clutching means is positioned between the bearing carrier and the inner bearing race to normally prevent relative axial movement therebetween unless wear of the clutch disc facings occurs.

The present invention also comprehends the provision of an automatic wear adjuster that is self-contained within the release bearing carrier assembly. The assembly is compact and requires no adjustment by the user when it is assembled to the vehicle clutch. Also, no maintenance is required for the assembly during use as the only moving parts involve the inner race of the release bearing and the bearing carrier; with frictional drag between these two members being provided by a sealing ring formed of a synthetic rubber composition or by an expanding metal ring such as utilized as a piston ring.

The present invention further comprehends the provision of a self-contained automatic wear adjuster having a spring-biased one-way clutch contained in the adjustment mechanism to provide for locking or relative axial movement between the release bearing and the bearing carrier. The bearing carrier assembly can be packaged for shipping by adjusting to a predetermined overall length slightly greater than its operational length. On installation in the vehicle with the clutch assembly already attached to the flywheel, the bearing carrier is mounted on the transmission bearing retainer, the release fork is assembled in place, and the transmission is attached to the engine. During the latter operation, the bearing carrier being of a slight excess in length is compressed between the clutch release fingers and the bearing retainer shoulder such that the retractor element is pushed into the carrier releasing the one-way clutch and permitting the release bearing to move relative to the inner carrier member; thereby adjusting the overall length to correspond precisely with the distance between the clutch fingers and the shoulder of the bearing retainer. Upon the operator actuating the clutch pedal through its first release cycle, the desired free play between the clutch fingers and bearing face and at the clutch pedal pad will be established.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a vertical cross sectional view of a typical clutch assembly for an automotive vehicle embodying the self adjusting bearing carrier of the present invention shown in elevation.

FIG. 2 is an enlarged vertical cross sectional view of the bearing carrier prior to installation.

FIG. 3 is a perspective view of the reactor for the wear adjuster assembly.

DESCRIPTION OF THE PREFERRED EMBODIMENT

Figure 4:
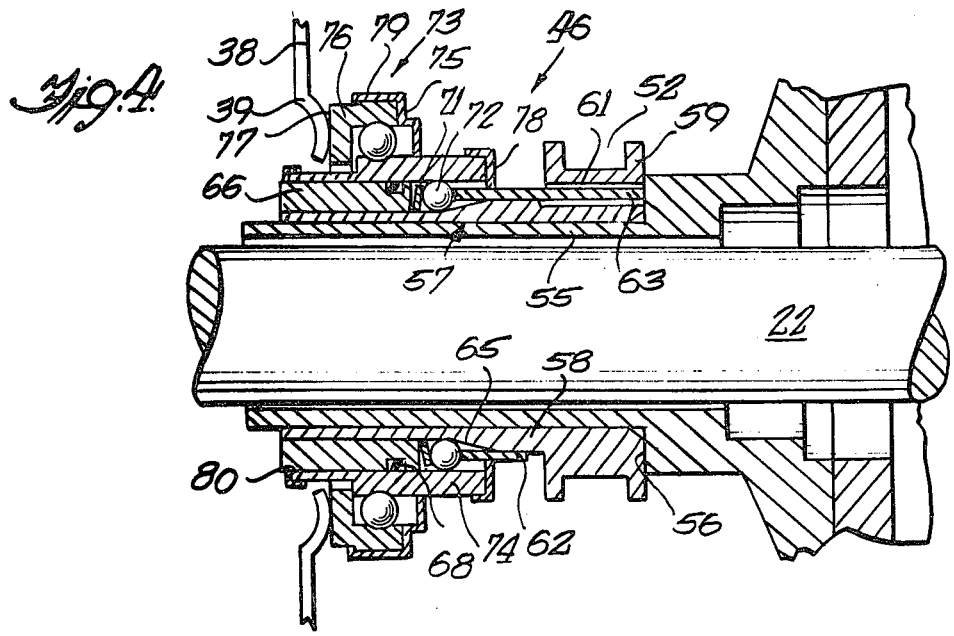
FIG. 4 is a vertical cross sectional view showing the initial installation of the bearing carrier before a release cycle occurs.

Referring more particularly to the disclosure in the drawings wherein is shown an illustrative embodiment of the present invention, FIG. 1 discloses a clutch assembly 10 for an automotive vehicle including an outer clutch housing 11 having a radial flange 12 at the open end 13 thereof adapted to be secured to the vehicle engine (not shown) and an opening 14 in the closed end wall 15 abutting the forward end of the transmission housing 16. The open end 13 receives a driving shaft 17 from the vehicle engine that is suitably secured by bolts 18 to a flywheel 19 having a friction surface 21 thereon facing the interior of the clutch housing 11.

A driven shaft 22 extends through the opening 14 into the transmission housing 16 and terminates adjacent the flywheel 19 in a splined end 23 received by the interiorly splined hub 24 of a clutch disc 25. The clutch disc may be of any suitable construction and is shown with a pair of annular parallel plates 26, 27 sandwiching the hub flange 28, with one plate extending outwardly to carry oppositely disposed annular friction facings 29, 29 thereon. Vibration damper springs 31 are mounted to yieldably connect the plates 26, 27 and the flange 28. An annular pressure plate 32 is located on the side of the clutch disc 25 opposite the flywheel 19 and is generally housed in a clutch cover 33 suitably secured to the flywheel; the pressure plate having circumferentially spaced lugs 34 operatively connected to the clutch cover in a conventional manner for rotation of the pressure plate therewith.

The pressure plate is provided with an annular fulcrum 35 adapted to cooperate with a diaphragm or Belleville spring 36 having an outer annular portion 37 contacting the fulcrum and a plurality of radially inwardly extending spring fingers 38 separated by slots and having curved inner ends 39 adapted to be engaged by a release bearing 73. The spring is mounted on a plurality of shoulder rivets 41 secured in the clutch cover 33 and projecting through enlarged openings (not shown) at the inner ends of the spring fingers to terminate in enlarged heads 42. The rivets support a round wire hoop 43 engaging the spring, and a second wire hoop 44 is positioned between the spring and an annular indentation 45 in the clutch cover 33. The hoops 43, 44 cooperate with the spring 36 to provide pivot surfaces for the spring to actuate the pressure plate and release or engage the clutch disc 25 between the flywheel 19 and the pressure plate 32.

A release bearing carrier assembly 46 is mounted for axial sliding motion relative to the driven shaft 22 and is actuated by a release fork 47 having a depression in the upper end 48 to be engaged by a ball stud 49 mounted in the end wall 15 for pivotal movement thereof. The release fork is bifurcated to provide a pair of parallel arms 51 received in the groove 52 of the carrier assembly 46 and depending therebelow to be connected to a release fork return spring 53 mounted on a stationary portion of the assembly 10. A flat leaf spring member 54 is positioned with one curved end engaging the rear surface of the head of the ball stud 49 and the opposite bifurcated ends received in the groove 52 to retain the release fork 47 in operative position.

The carrier assembly 46 includes a release bearing carrier 57 axially slidable upon a transmission bearing retainer 55 encompassing the rotary shaft 22 and providing a rearward shoulder 56 cooperating with the carrier 57 to limit axial movement thereof. The carrier includes a generally cylindrical portion 58 terminating at the rear end in a radial flange 59 provided with the annular groove 52 at its outer periphery. The radial flange 59, which may be integral or a separately attached piece, has circumferentially spaced openings 61, shown as three in number, extending therethrough to receive the legs or projections 63 of an annular reactor 62 encompassing the cylindrical portion 58 and slidable axially thereon. The cylindrical portion 58 is provided with a reduced diameter forward portion 64 defined by an inclined camming surface 65 on the order of a 10° to 15° angle relative to the axis, and a cylindrical insert 66 is press fitted onto the portion 64 to be permanently attached thereto. The insert is provided with an annular groove 67 to receive a sealing ring 68 of a suitable synthetic plastic or metallic material for a purpose to be later described.

The rear surface 69 of the insert 66 provides a shoulder against which an annular spring or springs 71, such as a Belleville or wavy ring spring, is positioned. A plurality of balls 72 are located freely between the surface 69 and the inclined surface 65 and are retained in an uncaged condition by an annular inner ball race 74 of a release bearing 73. The inner race 74 is slidably mounted on the insert 66 and engages the ring 68 which provides frictional drag between these two parts. The release bearing also has a plurality of balls 75 and an outer ball race 76 having a forward surface 77 adapted to engage the curved ends 39 of the spring 36.

The reactor 62 extends forwardly between the cylindrical portion 58 and the inner ball race 74 to engage the balls 72 that form a one-way clutch to be later described. An annular sealing member 78 which may have an L-shape in cross section is mounted on the rear end of the inner ball race 74 and sealingly engages the annular reactor 62 to inhibit the entrance of dirt or other contaminating material into the one-way clutch assembly. An enclosure ring 79 acts to retain lubricant in the bearing and prevent entrance of dirt. An additional annular seal 80 is mounted on the forward end of the inner race 74 to be in sealing contact with the insert 66.

FIG. 2 discloses the bearing carrier assembly 46 as it might be packaged prior to installation wherein it is adjusted to a predetermined overall length X slightly greater than its operational length. The sealing ring 68 may be formed of one of the synthetic rubber compositions in the shape of a simple "O" ring or of square cross section, or the ring might be made of metal in the form of an expanding piston ring; the ring providing a certain amount of frictional drag between the inner ball race 74 and the insert 66. The internal diameter of the inner ball race 74 is provided with a smooth, hard surface to provide a consistent drag of the seal ring 68 and the one-way clutch balls 72. The reactor 62 can be a die casting and the three legs or projections 63 thereof have a loose fit in the openings 61.

The bearing carrier assembly 46 in its packaged condition is assembled onto the transmission bearing retainer 55, the release fork 47 is engaged in the groove 52 in the release bearing carrier 57 and mounted on the ball stud 49 in the clutch housing 11. With the clutch package mounted onto the flywheel 19, the transmission with its housing 16 and housing 11 is moved forward and secured to the engine (not shown). During attachment of the transmission to the engine, the carrier 57 will be forced rearwardly by the clutch fingers until the flange 59 contacts the shoulder 56 of the retainer 55 during which the reactor 62 contacting the shoulder 56 is moved inward unlocking the one-way clutch. Since the distance from the clutch fingers to the retainer shoulder is less than the packaged overall length X of the carrier from the bearing face 77 to the flange face 59, the inner race 74 will move to the right against the frictional resistance of seal 68 shortening the overall length to the space available, as seen in FIG. 4.

Figure 5:
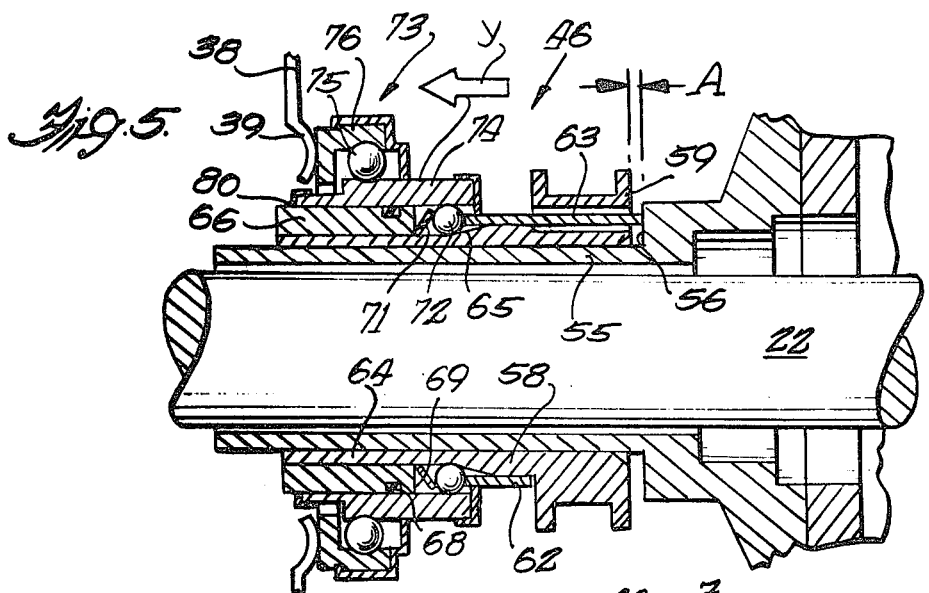
FIG. 5 is a vertical cross sectional view similar to FIG. 4, but showing the carrier at the start of the first clutch release cycle.
Figure 6:
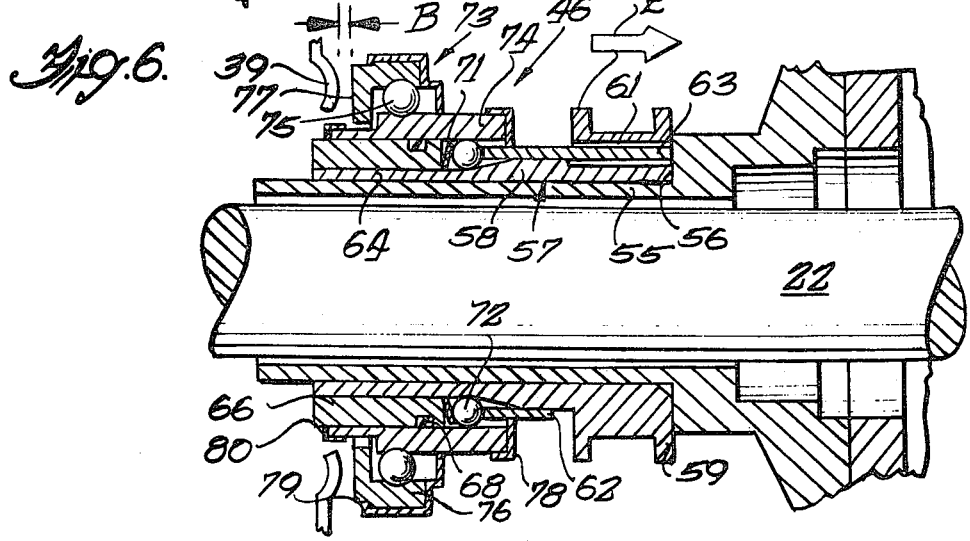
FIG. 6 is a vertical cross sectional view similar to FIG. 5, but showing the carrier at the completion of the first clutch release cycle.

Free play, shown as B in FIG. 6 will be accomplished during the first clutch release cycle. Considering the assembly in FIG. 4, the reactor 62 is in engagement with the balls 72 of the one-way clutch to urge the balls against the spring 71 so that the balls do not engage the inclined surface 65 and are overrunning, and the curved ends 39 of the spring fingers 38 contact the surface 77 of the release bearing 73. When the clutch pedal is depressed to actuate the release fork 47, the bearing carrier 57 is moved forward, as shown by arrow Y, the distance A (FIG. 5) relative to the retainer 55 during which movement the balls 72 remain in an overrunning condition. As the resistance load of the spring finger ends 39 acting against the release bearing 73 is greater than the frictional drag of the ring 68, the release bearing will maintain its position during the forward travel A of the bearing carrier 57 and slide relative thereto. Thus, the length of the assembly 46 from the bearing face 77 to the rear end of the carrier 57 will be shortened by the distance A (FIG. 5).

Once the distance A has been traversed, the balls 72 of the one-way clutch engage the inclined surface 65 and the interior surface of the inner race 74 to lock the inner race and carrier together and provide a positive drive unit for a clutch release action during the balance of the release stroke. Upon re-engaging the clutch, assuming no wear of the facings has occurred, the finger tips 39 push back the bearing carrier assembly 46 in the direction of arrow Z in FIG. 6. When the fingers 38 have reached the fully engaged position as shown in FIG. 5, the reactor 62 contacts the shoulder 56 of the transmission bearing retainer 55 and permits the balls 72 to disengage the carrier 57 from the release bearing 73. As the foot of the vehicle operator is lifted from the clutch pedal, the pedal return spring acting through the release fork 47 and the fork return spring 53 further retracts the bearing carrier 57 until it abuts the shoulder 55; the release bearing 73 moving with the carrier due to the frictional drag of the seal ring 68. The carrier and release bearing will have travelled a distance A in unison, and this provides the requisite free play B between the finger tips 39 and the bearing face 77 (FIG. 6).

With the conditions shown in FIG. 6, the next clutch disengagement will result in the carrier 57 and release bearing 73 moving forward a distance B, at which time the bearing surface 77 contacts the finger tips 39 and the spring 71 urges the balls 72 and reactor rearwardly to lock up the carrier and release bearing inner race 74 to provide positive drive of the release bearing and carrier for the balance of the clutch release stroke. Before proceeding farther, the following action during clutch engagement should be understood. When the operator is letting up on the clutch pedal consistent with obtaining smooth engagement of the clutch, the bearing carrier, despite the force of the clutch spring and return springs to push it rearward, can return only as fast as the operator's foot permits.

Clutch facing wear will result in the finger tips 39 moving rearwardly to a new position to fully engage the clutch on the clutch engaging stroke, thus tending to reduce the free play between the finger tips and the release bearing 73. However, the carrier assembly 46 will automatically adjust for this change. Just before the clutch fingers 38 reach the new position, the reactor 62 contacts the shoulder 56 causing release of the balls 72 of the one-way clutch, at which instant the force of the fingers 38 overcomes the resistance of the seal element 68 pushing back the bearing race 74 with respect to the inner carrier member 57 and reducing the overall length of the bearing carrier assembly, thus completing an adjustment cycle. Once the adjustment travel has occurred, the release bearing and carrier will then move rearward in unison to re-establish the freeplay B between the finger tips 39 and the bearing 77 (FIG. 6).

It is desirable that the force required by the reactor to release the balls be less than the force exerted by the return springs and less than the force required by the bearing to overcome the frictional drag of the seal; all forces being measured axially at the carrier.

Although a Belleville spring is shown in the illustrative embodiment of the present invention, it is understood that convention clutch release levers may be substituted for the Belleville spring. Also, the automatic wear adjustment device is equally adaptable to a pull-type clutch without any substantial assembly changes over the push-type clutch of the illustrative embodiment.

I claim:

1. A self-adjusting clutch release bearing assembly operated by a clutch release fork, the clutch including release levers adapted to be engaged by a release bearing to disengage the clutch, said bearing assembly comprising a bearing carrier axially reciprocable relative to a driven shaft and operatively connected to the clutch release fork, a clutch release bearing telescoped over the forward end of the bearing carrier adjacent the release levers and providing a running clearance therebetween, a yieldably biased one-way clutch between the release bearing and the bearing carrier, means providing frictional drag between the bearing carrier and the release bearing, and means to disengage said one-way clutch when said bearing assembly is in retracted position.

2. A self-adjusting clutch release bearing assembly as set forth in claim 1, including means providing a seal between said bearing carrier and said release bearing.

3. A self-adjusting clutch release bearing assembly as set forth in claim 1, wherein said bearing carrier has a generally annular groove receiving said one-way clutch with one side of said groove providing a shoulder and the opposite side providing an inclined camming surface.

4. A self-adjusting clutch release bearing assembly as set forth in claim 1, in which said clutch disengagement means comprises an annular reactor having one end adapted to engage the one-way clutch and the opposite end adapted to engage a bearing carrier stop means.

5. A self-adjusting clutch release bearing assembly as set forth in claim 1, including a transmission bearing retainer encompassing a rotary shaft and carrying said bearing carrier assembly.

6. A self-adjusting clutch release bearing assembly as set forth in claim 5, in which said transmission bearing retainer is secured in a housing for the clutch and has a stop shoulder to limit rearward movement of said bearing carrier.

7. A self-adjusting clutch release bearing assembly as set forth in claim 1, in which said one-way clutch comprises a plurality of clutch balls, an annular spring engaging said balls to bias them in one direction, and an inclined surface on said bearing carrier, said spring biasing said balls toward said inclined surface to wedge the balls between the inclined surface and said release bearing.

8. A self-adjusting clutch release bearing assembly as set forth in claim 7, including a reactor mounted on said bearing carrier and movable axially relative thereto to engage said clutch balls and disengage said one-way clutch.

9. A self-adjusting clutch release bearing assembly as set forth in claim 8, in which said reactor extends between said release bearing and said bearing carrier to engage said clutch balls in opposition to said annular spring and urge said balls away from the inclined surface.

10. A self-adjusting clutch release bearing assembly as set forth in claim 8, in which said clutch balls are biased into wedging engagement with said inclined surface and the interior surface of said release bearing.

11. A self-adjusting clutch release bearing assembly as set forth in claim 4, including sealing means between said release bearing and said reactor.

12. A self-adjusting clutch release bearing carrier assembly as set forth in claim 1, in which said frictional drag means includes a friction ring mounted in the exterior surface of said bearing carrier and frictionally engaging the interior surface of said release bearing.

13. A self-adjusting clutch release bearing assembly as set forth in claim 1, in which said clutch release levers are inwardly extending fingers of a diaphragm spring.

14. A self-adjusting clutch release bearing assembly operated by a clutch release fork, the clutch including release levers adapted to be engaged by a release bearing to disengage the clutch, said bearing assembly comprising a bearing carrier axially reciprocable relative to a driven shaft and operatively connected to the clutch release fork, a cylindrical insert press-fitted on the forward end of said bearing carrier and having an annular groove in the exterior surface thereof, a clutch release bearing telescoped over the forward end of the insert, a yieldably biased one-way clutch between the release bearing and the bearing carrier, means providing frictional drag between said bearing carrier and said release bearing and including a friction ring mounted in the annular groove of said insert and frictionally engaging the interior surface of said release bearing, and means to disengage said one-way clutch when said bearing assembly is in retracted position, said release bearing comprising an inner race slidably mounted on said insert and engaging said friction ring, an outer race and a plurality of bearing balls therebetween, said outer race having a bearing face adapted to engage the clutch release levers.

15. A self-adjusting clutch release bearing assembly as set forth in claim 14, in which said insert provides a shoulder spaced from the forward end of the bearing carrier, and an inclined surface on said bearing carrier is axially spaced from said shoulder and forms with said shoulder a generally annular groove to receive said one-way clutch.

16. A self-adjusting clutch release bearing assembly operated by a clutch release fork of a vehicle clutch including clutch release levers adapted to be engaged by a release bearing to disengage the clutch, a driven shaft operatively connected to the clutch, and a clutch housing having a transmission bearing retainer encompassing the driven shaft secured therein and having a shoulder thereon, said bearing assembly comprising a bearing carrier encompassing and axially movable on said transmission bearing retainer, said bearing carrier being operatively connected to said release fork, a cylindrical insert affixed on the forward end of said carrier and providing a shoulder, an inclined surface on said carrier axially spaced rearwardly of said shoulder, said insert having an annular groove therein, a friction ring positioned in said groove, a release bearing having an inner race axially slidable on said insert and engaging said friction ring and an outer race having a face adapted to engage the clutch release levers, said inner race overlapping said shoulder and inclined surface, a one-way clutch located between said shoulder and inclined surface and including an annular spring engaging said shoulder and a plurality of clutch balls biased by said spring towards said inclined surface to wedge between the inclined surface and the interior surface of said inner race, and an annular reactor encompassing and axially slidable on said bearing carrier, said reactor having a forward edge adapted to extend between said inner race and said bearing carrier to engage said clutch balls and an opposite edge adapted to engage said shoulder on the transmission bearing retainer during at least a portion of the axial movement of said bearing assembly.

17. A self-adjusting clutch release bearing assembly as set forth in claim 16, in which said bearing carrier terminates at its rear end in a radial flange having means receiving said release fork and a plurality of openings therethrough, said reactor having a plurality of legs received in said openings to project therethrough towards said transmission bearing retainer shoulder.

* * * * *